(12) United States Patent
Geier et al.

(10) Patent No.: US 12,150,824 B2
(45) Date of Patent: Nov. 26, 2024

(54) SYSTEM FOR THE MANUFACTURE OF A DENTAL PROSTHESIS

(71) Applicant: Ivoclar Vivadent AG, Schaan (LI)

(72) Inventors: Markus Geier, Tisens (IT); Frank Frenzel, Balgach (CH); Thomas Baaske, Mols (CH); Roger Frei, Heerbrugg (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/066,849

(22) Filed: Dec. 15, 2022

(65) Prior Publication Data

US 2023/0118604 A1 Apr. 20, 2023

Related U.S. Application Data

(62) Division of application No. 16/512,078, filed on Jul. 15, 2019, now Pat. No. 11,559,380.

(30) Foreign Application Priority Data

Jul. 16, 2018 (EP) .................................... 18183660

(51) Int. Cl.
*A61C 13/08* (2006.01)
*A61C 13/00* (2006.01)

(52) U.S. Cl.
CPC ........ *A61C 13/082* (2013.01); *A61C 13/0004* (2013.01); *A61C 13/0022* (2013.01); *Y10T 29/49567* (2015.01); *Y10T 428/216* (2015.01)

(58) Field of Classification Search
CPC .............. A61C 13/082; A61C 13/0004; A61C 13/0022; A61C 13/0016; A61C 13/0019; A61C 13/0018
See application file for complete search history.

(56) References Cited

U.S. PATENT DOCUMENTS 4,403,961 A  9/1983  Gurney
4,970,032 A  11/1990 Rotsaert
(Continued)

FOREIGN PATENT DOCUMENTS

CN  1511501 A  7/2004
CN  101862225 A  10/2010
(Continued)

*Primary Examiner* — Nicholas D Lucchesi
(74) *Attorney, Agent, or Firm* — Ann M. Knab; Thad McMurray

(57) ABSTRACT

A dental prosthesis is provided, manufactured from a monobloc or multibloc prosthesis blank (10), which is composed of a gum-colored material (14) and a tooth-colored material (12), which materials (12, 14) are bonded to each other by bonding, polymerization and/or one-piece manufacture. The boundary surface (16) between the materials is wave-shaped comprising alternating grooves (22) and ribs (24) in the course of the dental arch, and radial in an oral-vestibular direction in the region of the anterior teeth (33) to be created. The boundary surface (16), at least in the region of the molars (26)—again as viewed in the oral vestibular direction—has parallel grooves (22) and ribs (24) forming troughs and crests of the waveform, or grooves (22) and ribs (24) such that they extend in deviation from parallel by at most 10 degrees, in particular at most 5 degrees, at least in the region of the molars (26).

6 Claims, 6 Drawing Sheets

(56) References Cited

U.S. PATENT DOCUMENTS

| | | | | |
|---|---|---|---|---|
| 5,121,334 | A | * | 6/1992 | Riley ................ G05B 19/4207 715/850 |
| 5,128,870 | A | * | 7/1992 | Erdman ............ G05B 19/4207 700/182 |
| 5,224,049 | A | * | 6/1993 | Mushabac .......... G05B 19/4207 264/222 |
| 5,347,454 | A | | 9/1994 | Mushabac |
| 8,195,320 | B2 | | 6/2012 | Garcia-Aparicio |
| 9,113,986 | B2 | | 8/2015 | Shima |
| 9,259,291 | B2 | * | 2/2016 | Gantes ..................... A61B 1/24 |
| 9,901,417 | B2 | * | 2/2018 | Gantes .................. A61C 1/084 |
| 10,646,311 | B2 | | 5/2020 | Watzke et al. |
| 2013/0101962 | A1 | | 4/2013 | Howe |
| 2014/0234802 | A1 | | 8/2014 | McDermott et al. |
| 2014/0317930 | A1 | | 10/2014 | Klingenburg et al. |
| 2016/0135931 | A1 | | 5/2016 | Morales et al. |
| 2017/0319304 | A1 | * | 11/2017 | Borowski .......... A61C 13/0022 |
| 2018/0042705 | A1 | | 2/2018 | Howe |
| 2018/0071063 | A1 | | 3/2018 | Watzke et al. |
| 2018/0078348 | A1 | | 3/2018 | Ruppert et al. |
| 2023/0045846 | A1 | * | 2/2023 | Watzke ................ A61C 13/082 |
| 2023/0045917 | A1 | * | 2/2023 | Watzke .............. A61C 13/0022 |
| 2023/0121316 | A1 | * | 4/2023 | Rampf ............... A61C 13/0004 409/131 |
| 2023/0165667 | A1 | * | 6/2023 | Frei .................... A61C 13/0022 264/16 |

FOREIGN PATENT DOCUMENTS

| | | |
|---|---|---|
| JP | 2016000161 A | 1/2016 |
| WO | 2010/057584 A1 | 5/2010 |
| WO | 2017027089 A1 | 2/2017 |

\* cited by examiner

SYSTEM FOR THE MANUFACTURE OF A DENTAL PROSTHESIS

CROSS-REFERENCE TO RELATED APPLICATIONS

This application is a divisional application of and claims priority to U.S. application Ser. No. 16/512,078 filed on Jul. 15, 2019, which claims priority to European Patent Application No. 18183660.2 filed on Jul. 16, 2018, the disclosures of which are incorporated herein by reference in their entirety.

TECHNICAL FIELD

The invention relates to a system for the manufacture of a dental prosthesis.

BACKGROUND OF THE INVENTION

It has been known for long that dentures, but also teeth, are produced to consist of several layers.

The solutions known from WO 90/13268 A1 and corresponding U.S. Pat. No. 4,970,032, which is hereby incorporated by reference, and WO 91/07141 A1 are examples thereof.

Based on these reasonably old solutions, multilayer plastic elements have recently been proposed using CAD/CAM technology, which plastic elements are to be used for the manufacture of teeth and prostheses to provide the teeth and the prosthesis base for a finished prosthesis. Due to the various requirements of the different materials, i.e. gum-colored denture base material on the one hand and tooth-colored denture material on the other hand, this approach has not yet been implemented, even though it has already become known otherwise that both teeth and a denture base made of PMMA can be produced.

In addition, rapid prototyping techniques have recently been proposed to provide both teeth and prosthesis bases made of plastic material or other materials, as appropriate. Actually, this approach has not yet made any real progress either.

On the other hand, in view of increasing life expectancy, there is increasing demand for full and partial prostheses, wherein, for the sake of simplicity, both full and partial prostheses are subsumed under the term prostheses. This increasing demand is accompanied with an ever increasing cost pressure, if only due to considerably increasing demand which is to be expected.

From EP 3 064 170 A1 and corresponding US 20180071063, which is hereby incorporated by reference, it is known to create the boundary surface between materials as having a radially extending waveform. The waveform may then simultaneously represent the catenary line of the gingiva margin.

This solution has the advantage that regardless of the size of the required dental arch, the gingival margin is always generated automatically, so that possible errors are automatically avoided.

Trials have shown that especially with small dental prostheses fabricated while following this approach, the chewing performance is perceived by the patients as being unsatisfactory.

With this solution, patients having comparatively large dental arches may find their front teeth somewhat shapeless.

SUMMARY OF THE INVENTION

On the other hand, the object of the invention is to provide a dental prosthesis according to the claims, which improves the solutions known from prior art, in regard of both aesthetics and functionality, without entailing economic disadvantages.

According to the invention, this problem will be solved by claim 1. Advantageous embodiments will arise from the subclaims.

According to the invention, it is intended to initially provide a two-colored blank for a dental prosthesis. The portion from which the dental arch will subsequently be formed is tooth-colored, and the portion from which the denture base will subsequently be formed is gum-colored.

Processing can be carried out in any suitable manner, for example by milling or other ablative procedures.

A boundary surface exists between the materials which, as viewed along the course of the dental arch, extends in a wave-shaped manner, i.e., along the portion from which the dental arch will subsequently formed.

The waveform is adapted to resemble the gingival margin. Accordingly, it essentially is formed as a chain line.

Reference is made to EP 3 064 170 A1 and corresponding US 20180071063, in its entirety. This patent application of the present applicant has the aforementioned wave-shaped course between the gum-colored and the tooth-colored material.

In the region of the anterior teeth, the crests and troughs of the undulating course, according to the invention, extend radially, i.e. they extend radially on the same height level and starting from a radial center.

According to the invention, it is intended for the course of the boundary surface in the region of the anterior teeth to accordingly match the above-mentioned provisional application.

On the other hand, according to the invention, it is provided, at least in the area of the molars, for the crests and troughs, which can also be regarded as ribs and grooves, to extend parallel to each other.

Surprisingly, this simple measure allows to improve both the function and the aesthetics of the dental prosthesis according to the invention.

The inventive dental prosthesis makes it possible to provide tooth sets suitable for both small and large dental arches. As to large dental arches, the dental arch is slightly milled further radially outwards, i.e. in the vestibular direction, and as to small dental arches, milling is done further inwards, i.e. in the oral or lingual direction.

Due to this inventive parallelization of the troughs and troughs at the boundary surface in the molar region, a comparatively large occlusal surface is available even with small dental arches.

It has been shown that it is the chewing cusp that are essential for chewing efficiency, and it is the shape thereof having good markedness that allows to create the inventive boundary surface. Unlike the vestibular side, on the oral or lingual side the same width in the mesial-distal direction is available for each tooth, so that a massive chewing cusp can easily be accommodated therein.

In addition, the anterior teeth are of significant aesthetic importance. In the case of small dental arches for narrow facial forms and narrow mouths, an arch displaced radially inwards, i.e., an arch which is displaced in the oral or lingual direction, can be milled without further intervention, which arch results in correspondingly narrow front teeth.

Nevertheless, as explained above, chewing function in the molar region is sufficiently present.

In an advantageous embodiment of the invention, parallel orientation of grooves and ribs in the premolar and/or canine region can be transferred towards radial orientation.

For example, the teeth of one and two can have radial grooves and ribs including an actual radial center. However, the rib of the tooth of three will no longer pass through this center. As a result, the rib in question is less radial and rather is parallel to the adjacent two ribs.

This is also true for the rib of four, which in turn has a course that is even closer to parallelism.

The next ribs, that of five, that of six and that of seven, are fully parallel to each other.

Another advantage is that the partly radial and partly parallel course of the grooves and ribs, i.e. crests and troughs, does not extend from the oral center to the vestibular outer edge, but only extends across a tooth forming region, for example, having an oral-vestibular or lingual-vestibular extension of in the range of 0.5-5 cm, 1-4 cm, such as 2 cm.

In this region, it is intended that the dental arch is processed by milling.

In this configuration, it is also sufficient for the tooth-colored material to only be provided in this region. The gum-colored material is then intended to be used for the entire remaining blank.

In any case, the shaping region is essentially U-shaped, thus it extends like a U having quite wide legs.

The blank of the invention can be disc-shaped, it may, for example, be formed as being flat and cylindrical having a projecting clamping edge and a diameter between 50 and 110, 75 and 100, or 95 and 100 mm.

However, any other shape will also be possible, for example an arch of the blank or a triangular shape.

The troughs of the boundary surface are preferably adapted to the width of the tooth to be produced. In particular, the trough can have the largest trough width for the first molar.

The crests and troughs within the shaping region have congruent shape both in the front tooth region and in the rest of the tooth region.

The crests and/or troughs can be connected at their tops to a ridge line, which can either be straight or curved, for example also curved in an S-shape.

According to the invention, it is intended to determine a suitable dental arch size by scanning the patient's mouth or, if required, by impressing, and to determine the target size of the dental arch based thereon by determining the forming line within the forming region. For smaller target sizes, the formation line rather extends towards the oral direction, and extends towards the vestibular direction for larger target sizes.

In this respect, it is selected and determined in the inventive system for both horizontal directions, at which point the dental arch is to be milled down.

In an advantageous embodiment, a system for the manufacture of a dental prosthesis using a prosthesis blank is provided. The blanks are produced in a suitable device, e.g. by injection molding. In this embodiment, the blanks are to have at least one reference mark on or referring to the boundary surface, which is either real or virtual.

The boundary surface is thus marked directly or is marked at least in the CAD/CAM data. The milling machine reads the reference mark and will remove the limits up to which the tooth-colored and gum-colored material is to be milled.

Another advantageous system for the manufacture of a dental prosthesis is a storage device. It is installed in a CAD/CAM device or the CAD/CAM device accesses the storage device.

The geometry of each blank, in particular the extent of the boundary surface in space, is stored therein. A tooth library is also stored in the storage device. The CAD/CAM device or any other computer outputs a proposal for placing of teeth on the gum-colored material, i.e. the prospective denture base.

However, this can still be changed by the user's intervention. It is also possible for the CAD/CAM device to detect the user's changes, taking them into account when creating new setup proposals. This is called deep learning.

In an advantageous embodiment, an additional layer of a material having different refractive properties, in particular due to different refractive indices of this material compared to both the gum-colored and the tooth-colored material, is arranged between the tooth-colored and the gum-colored material.

These properties are promoted by the presence of organic and/or inorganic components which change the transparency or opacity of the coating. They are preferably polymerizable by radical polymerization, especially thermal or light-induced polymerization, and together with the materials are thermoplastically processed and inserted between the materials.

This results in an opaque layer, in particular an organic opaque, preferably a light-curing opaque layer, on the boundary surface between the materials. This prevents the gum color of the base material from radiating into the lighter tooth material, thus falsifying the natural appearance. A somewhat greyish gingival margin is avoided and the chroma of the gingival or tooth-colored material is not adversely affected.

BRIEF DESCRIPTION OF THE DRAWINGS

Further advantages, details and features will arise from the following description of an embodiment of the invention b making reference to the drawings, wherein.

DETAILED DESCRIPTION

Figure 1:
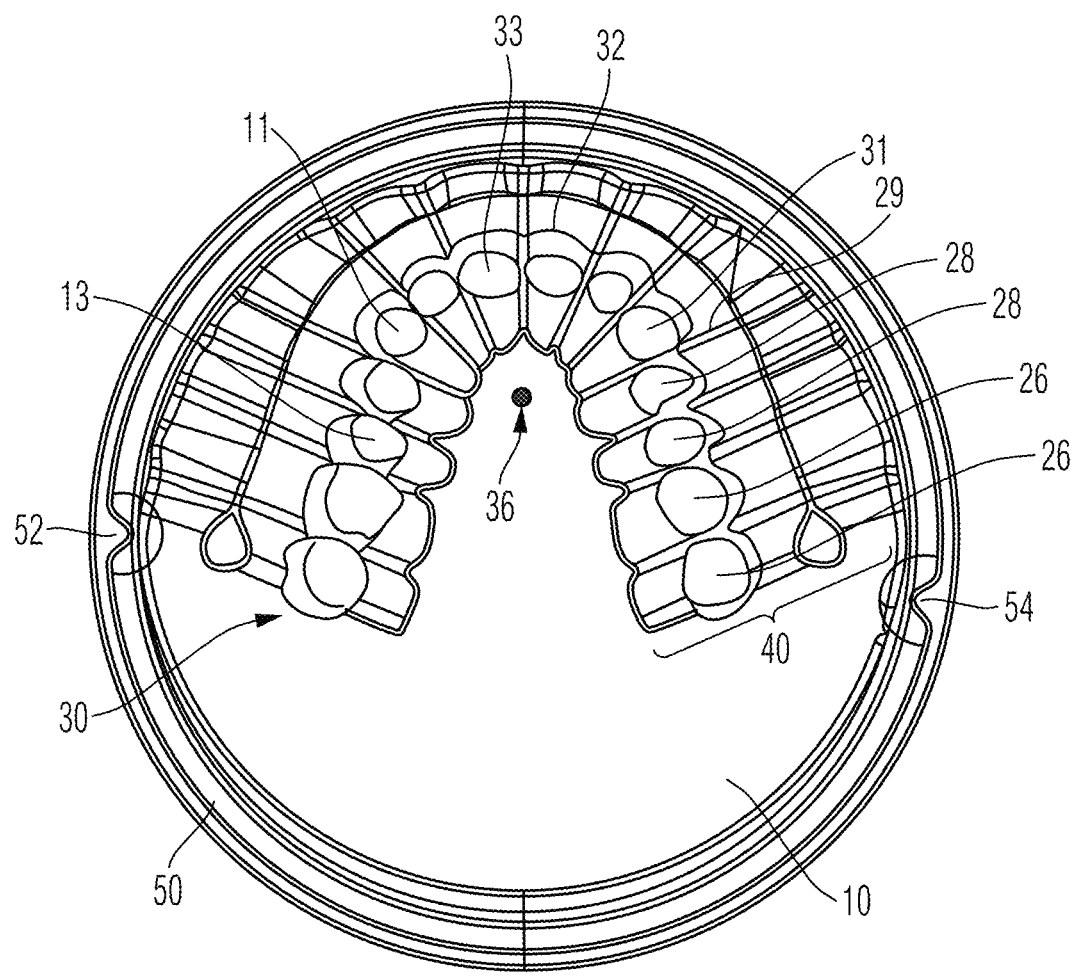
FIG. 1 is a bottom view of a dental arch to be created in a blank disc according to the invention.

The blank 10 shown in FIG. 1 essentially is disc-shaped. The top region in FIG. 1 is intended for realization of a dental arch 11 and the bottom surface thereof is shown in FIG. 1. The basal surfaces 13 of the individual teeth of the dental arch 11 are to be recognized.

The blank 10 consists of a disc of tooth-colored material and a disc of gum-colored material, which are bonded together by gluing or in any other suitable way. In this respect, the arrangement of the materials may better be seen in FIG. 3.

Between the materials there is a boundary surface 16 having an undulating course. The course is modelled to match a human gingival margin.

Accordingly, troughs 22 and crests 24 are alternatingly arranged, as can schematically be seen from FIG. 1.

The troughs 22, which correspond to grooves, are designed to accommodate teeth, and the crests 24, which correspond to ribs, subsequently form the interdental spaces.

The boundary surface 16 extends over the course of the dental arch 11 in a wave-shaped manner. As viewed in an oral-vestibular direction, it has a specific course.

In the region of the front teeth 33 the course is radial, starting from a radial center 36.

On the other hand, in the remaining region, the course of the wave crests and wave troughs in the oral-vestibular direction is non-radial. As far as the molars 26 are concerned, the crests 24 and troughs 22 of adjacent teeth extend parallel to each other. However, the grooves 22 and ribs 24 may also extend by a maximum of 10 degrees, and in particular a maximum of 5 degrees, away from parallelism.

This also applies to the crests and troughs of the premolars 28.

The rib 29 in the interdental space between canine 31 and the first premolar 28 is parallel to the following rib in the distal direction. The trough 22, in which the canine tooth 31 is located, is radially widened outwards, as are the troughs of the anterior teeth 33.

The region in which dental arches 11 can be created is limited in the oral vestibular direction. It is referred to as shaping region 40.

A clamping edge 50 projecting outwards is formed on the outer circumference of the blank 10. This is to accommodate the disc-shaped blank in the workpiece holder of a dental milling machine in a manner known per se.

Basically, the disc formed by the blank 10 is of circular shape. However, it comprises grooves 52 and 54 on a level below the clamping edge 50. The grooves 52 and 54 are not diametrically opposed to each other, so that anti-twist protection is assured.

Figure 2:
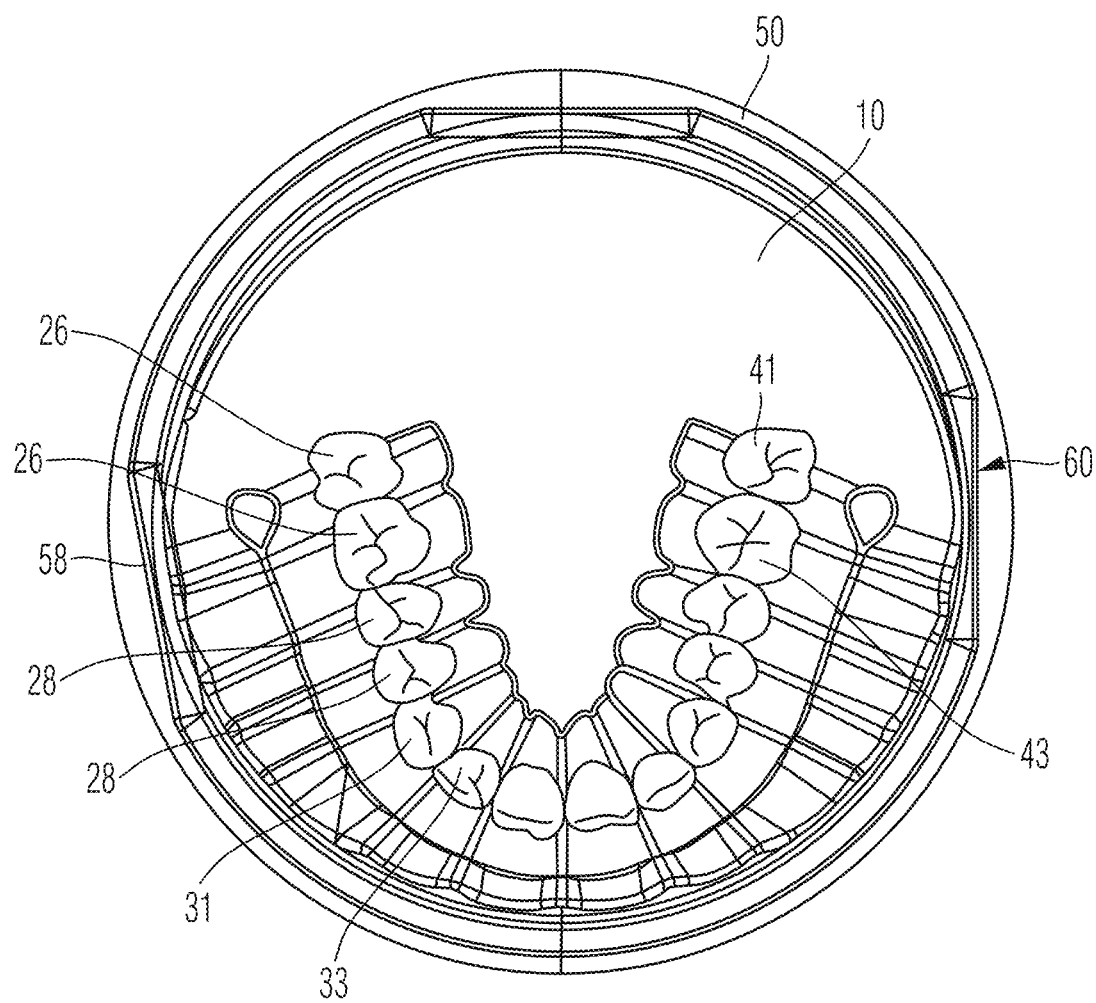
FIG. 2 is a top view of the dental arch according to FIG. 1, also showing the denture blank.

From FIG. 2 the blank disc according to FIG. 1 may be seen in top view on the dental arch 11. Herein, the same reference numbers are used as in the other figures to denote the same parts.

The teeth 26, 28 and 31 may be seen including their occlusal surface 41, and it can be seen that, for example, there is quite large space available for the chewing cusp 43 of the first molar 26, even if the dental arch 11 is kept small, i.e. shifted towards the oral direction.

Above the clamping edge 50, i.e. on the tooth side of the prosthesis, a different anti-twist device from that shown in FIG. 1 is provided. It has flattenings 58 and 60, which are distributed asymmetrically, as are the grooves 52 and 54.

Figure 3:
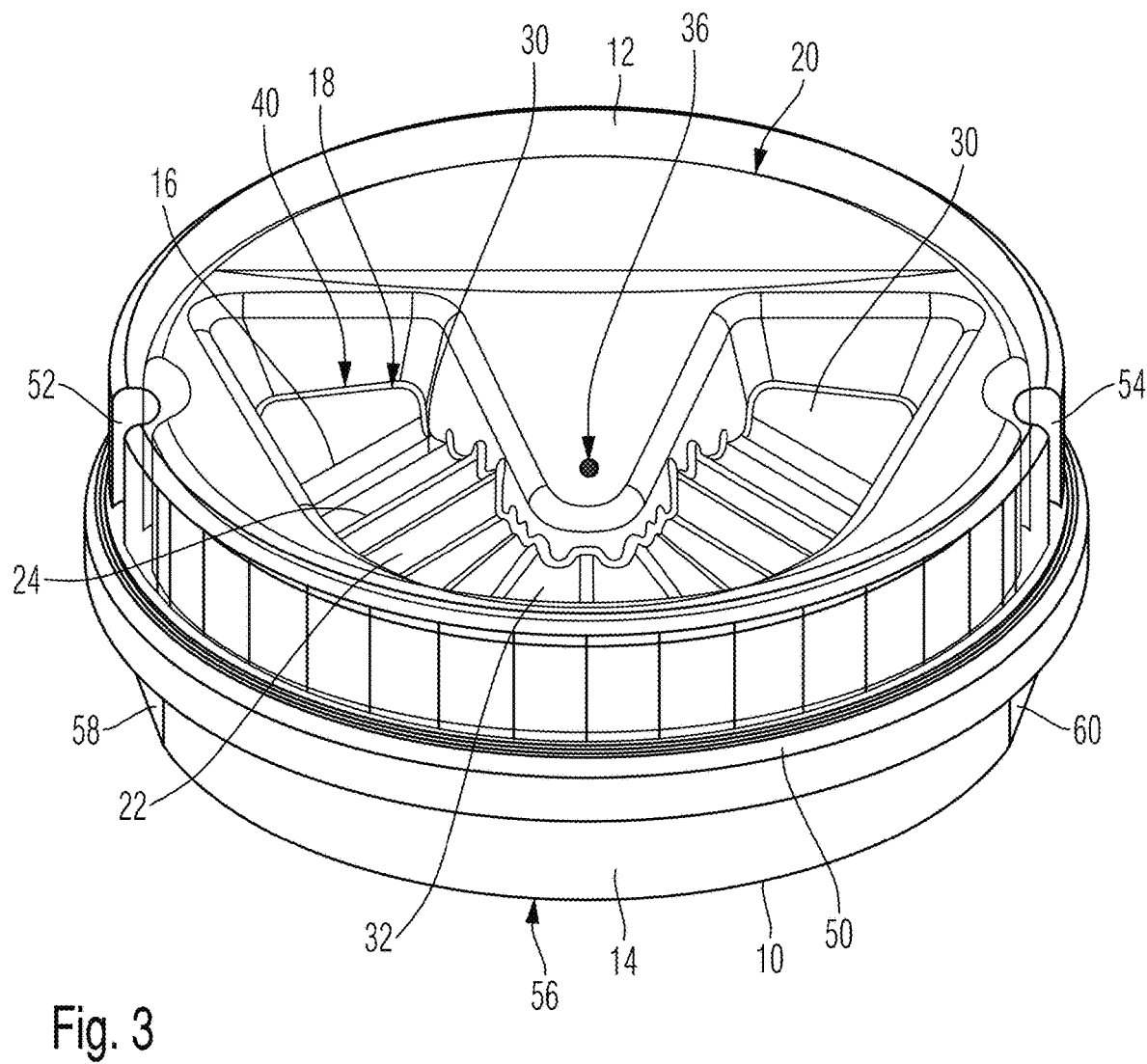
FIG. 3 is a schematic perspective view of a prosthesis blank according to the invention.

FIG. 3 shows a blank 10 consisting of a tooth-colored material 12 and a gum-colored material 14. It is for the manufacture of a mandibular dental prosthesis.

The blank 10 is essentially disc-shaped. A boundary surface 16 between the tooth-colored material 12 and the gum-colored material 14 is shown in FIG. 3. It has a specifically shaped recess 18 in the gum-colored material 14. The material 12 extends into the recess 18, starting from the upper side 20 of the blank 10.

The tooth-colored material 14 of the blank 10 has a diameter or width of more than 5 cm and in particular a substantially flat cylindrical shape with a diameter to height ratio of more than 2 to 1, preferably more than 3 to 1.

The gum-colored and tooth-colored materials 14 and 12 are bonded together, e.g. by bonding, polymerization and/or monobloc production.

The recess essentially has the shape of a U having rather wide legs, i.e. a dental arch shape. The boundary surface 16 is therein formed there in a specified way. It has a wave form over the course of the U, corresponding to a gingiva margin, i.e. essentially corresponding to a chain line.

The waveform has alternating wave troughs 22 and wave crests 24. The wave troughs are also grooves, and the wave crests are ribs.

The peaks of the wave crests 24 and also the peaks of the wave troughs 22, which face downwards, each form a ridge line.

The ridge lines downwardly extend from distal 30 towards the mesial 32 direction. The boundary surface 16 is diagonally located in the blank 10 and is higher at the front, i.e. in the region of the anteriors, than in the rear region.

This refers to the average course of boundary surface 16, which is actually undulating, as described above.

Herein, the inclination angle or the inclination of the boundary surface 16 is on average 16 degrees.

In the region of the anterior teeth or anteriors, the wave crests and wave troughs 24 and 22 are radially extending from the oral towards the vestibular direction. They extend radially outwards from radial center 36.

On the other hand, they extend parallel to each other in the molar and premolar region. The leg width of the U, and thus the width of the recess 18, is considerably more than required for shaping teeth. The blank 10 is designed to realize both large and small dental arches by milling the teeth radially inside, radially in the middle or radially outside with respect to the center 36.

In this respect, the entire width of the U is available as a shaping region 40 for shaping.

As can be seen from FIG. 3, the recess 18 is significantly deeper in the distal region 30 than in the mesial region 32. This results in a significantly greater height of the tooth-colored material 12 in the distal direction than in the mesial direction. As a result of this measure, the anterior tooth region 32 moves closer to the top surface 20 of the blank 10, and undercuts can rapidly and accurately be milled therein using short milling cutters, as required.

FIG. 3 also shows that the blank 10 has a circumferential clamping edge 50. The clamping edge 50 has the usual shape for dental disc blanks, and the disc-shaped blank 10 has a diameter between 95 and 100 mm.

Above the clamping edge 50, the tooth-colored material 12 backwardly, wherein grooves 52 and 54 are provided asymmetrically arranged to each other, i.e. are not arranged diametrically opposite to each other, serving as an anti-twist device.

Additional flattenings 58 and 60 are formed on the bottom side 56 of the blank 10. They are provided in the region of material 14 and are also asymmetrical to each other. They are used for alternative clamping in more recent milling machines to prevent twisting.

Figure 4:
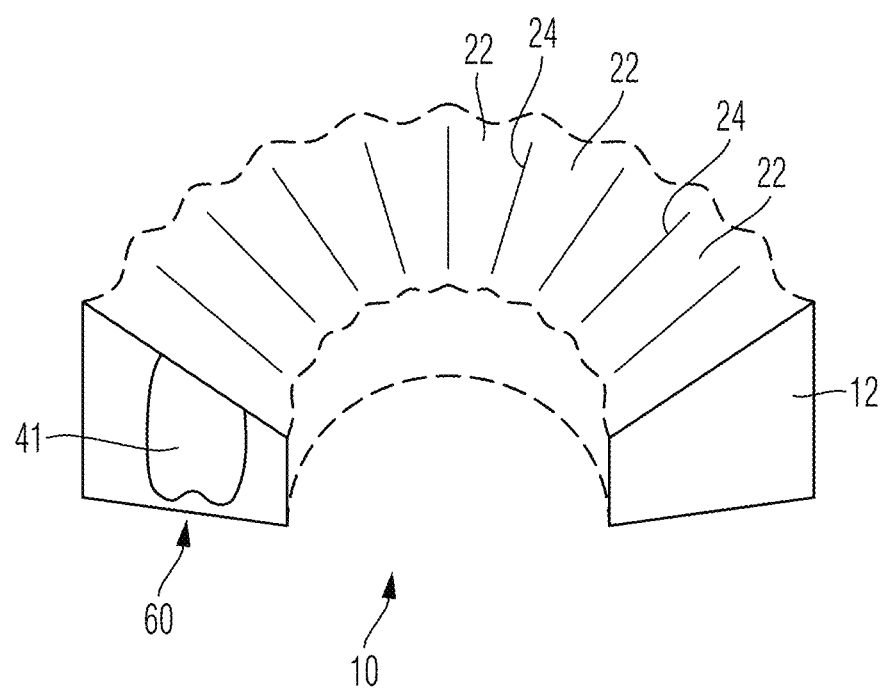
FIG. 4 is a schematic perspective view of another embodiment of a prosthesis blank according to the invention.

FIG. 4 shows another embodiment of a blank 10. Only the tooth-colored material 12 of the blank is shown, whereas the remaining parts, for example, extend and are formed according to FIG. 3.

On the side shown below in FIG. 3, the occlusal plane 60 extends. Accordingly, a tooth 41 in FIG. 4 is drawn into the material 12, such that its occlusal surface faces the occlusal plane 60.

Contrary to the embodiments shown in FIGS. 1 to 3, in FIG. 4 the crests, i.e. the ribs 24, are inclined towards the vestibular-oral direction, while in FIG. 3, for example, they extend straight, i.e. parallel to the occlusal plane.

Towards the oral direction, the ribs 24 are more occlusal than vestibular.

The angle between the occlusal plane 60 and the rib 24 can largely be adapted to the requirements. For example, the angle can be 10 to 20 degrees, but may also be above.

For the individual teeth or interdental spaces, the angle can also be different.

The crests 24 correspond to interdental spaces and the troughs 22 correspond to the teeth.

The inclination shown in FIG. 4 refers to both the crests 24 and the troughs 22.

It has been shown that the inclined position provided, in this respect, allows for better adjustment, especially in the case of large differences between dental arches.

Figure 5:
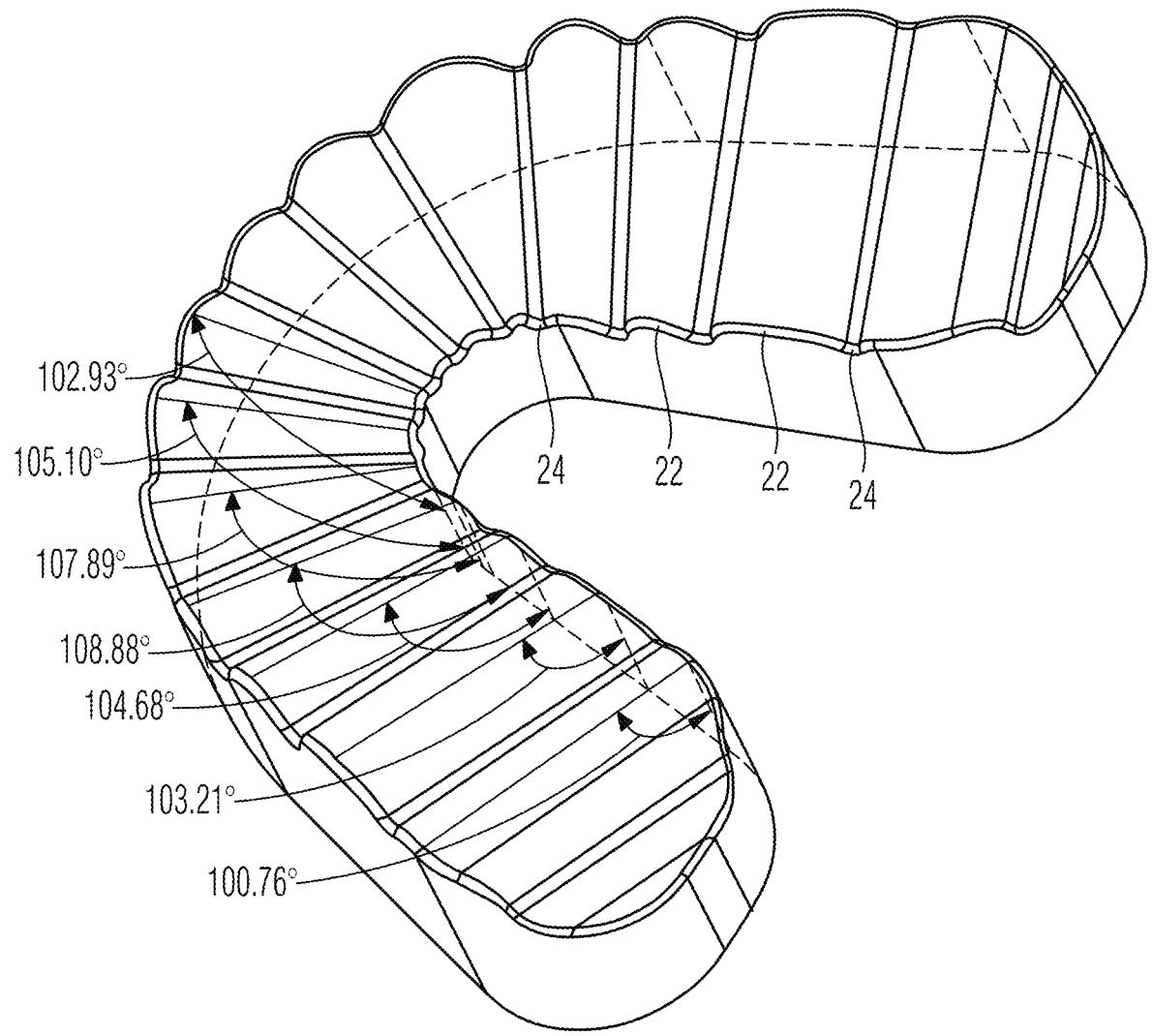
FIG. 5 is a schematic perspective view of another embodiment of a prosthesis blank according to the invention.
Figure 6:
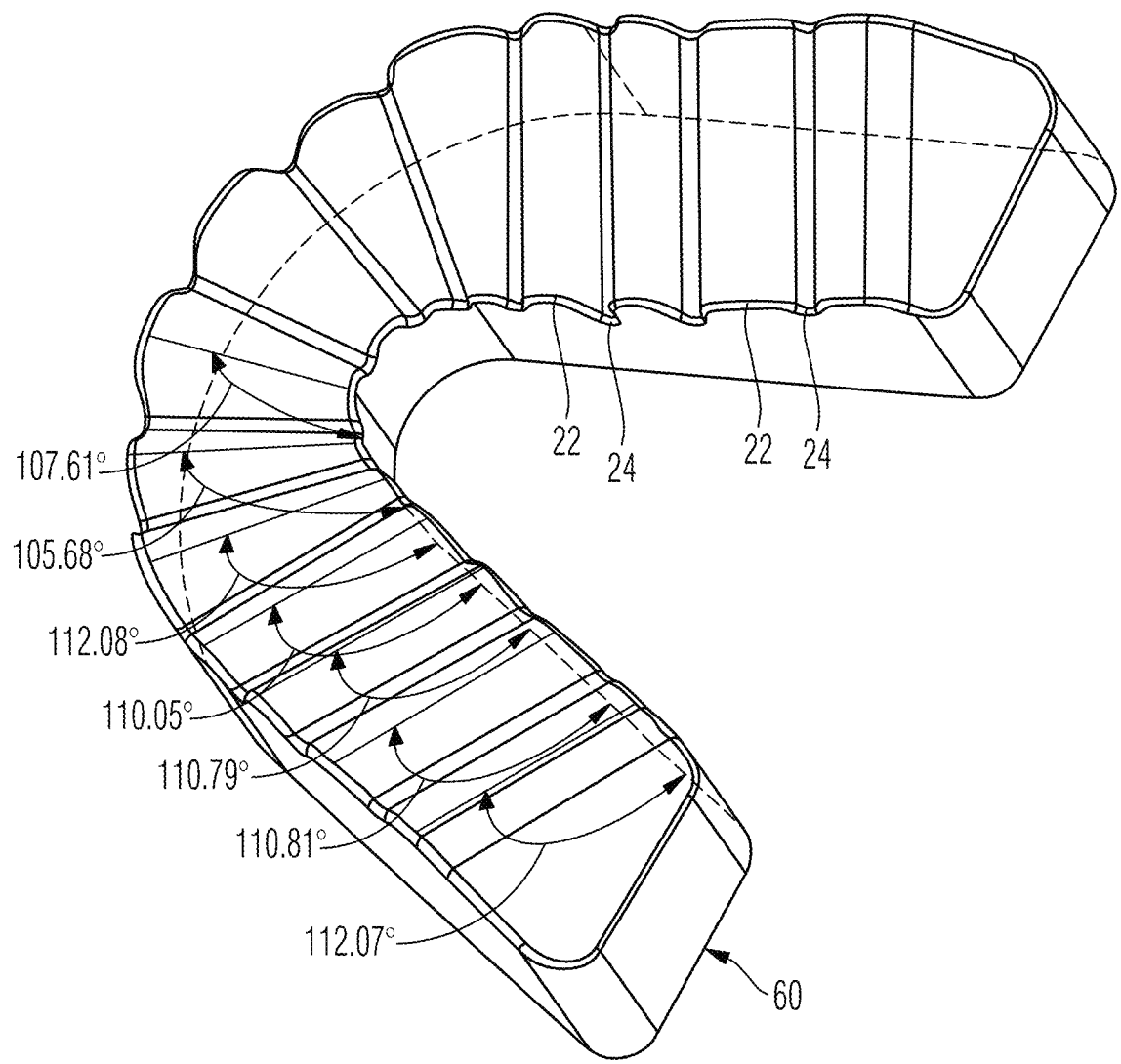
FIG. 6 is a schematic perspective view of a further design of a prosthesis blank according to the invention.

Exemplary inclination angles of the crests 24 are shown in FIG. 5 for the lower jaw, and are shown in FIG. 6 for the upper jaw. The angles of inclination as indicated therein refer to a normal to the blank, which blank is disc-shaped.

In relation to occlusal plane 60, the angles for the mandible according to FIG. 5 are between 10 degrees and 19 degrees and for the maxilla are between 15 degrees and 23 degrees.

It is understood that adjustments of the angle and also of the course of the ridge line across the dental arch are widely possible depending on the requirements.

What is claimed is:

1. A system for the manufacture of a dental prosthesis from a prosthesis blank having a tooth-colored material and a gum-colored material between which a boundary surface extends, the system comprising:
    a blank manufacturing device for the blank which marks at least one reference mark in real or virtual form to or in relation to the boundary surface,
    a machining device which detects the reference mark and performs machining at least partially based thereon,
    wherein the boundary surface has a radially extending waveform,
    a storage device which is arranged in a CAD/CAM device or the CAD/CAM device accesses the storage device, in which a geometry of the blank comprising also an extension of the boundary surface in space is deposited,
    a tooth library which is stored in the storage device, and
    wherein the CAD/CAM device makes a proposal for the positioning of the tooth colored material on the gum-colored material.

2. The system for the manufacture of a dental prosthesis according to claim 1,
    wherein the blank manufacturing device marks a real boundary surface or marks the boundary surface in CAM/CAD data.

3. The system according to claim 1,
    wherein the CAD/CAM device detects user changes and takes said changes into account when establishing new deployment proposals.

4. The system according to claim 1,
    further comprising a milling machine which reads the reference mark and removes the limits up to which the tooth-colored and gum-colored material is to be milled.

5. The system according to claim 1,
    wherein a suitable dental arch size is determined via a scan or via an impression of a patient's mouth and, based thereon, a target size of the dental arch is determined by defining a shaping line within a shaping area.

6. The system according to claim 5,
    wherein the shaping line extends more orally for smaller target sizes and more vestibularly for larger target sizes.

* * * * *